I. B. NAYLOR.
IRRIGATION.
APPLICATION FILED OCT. 28, 1913.
1,153,332.
Patented Sept. 14, 1915.
9 SHEETS—SHEET 1.
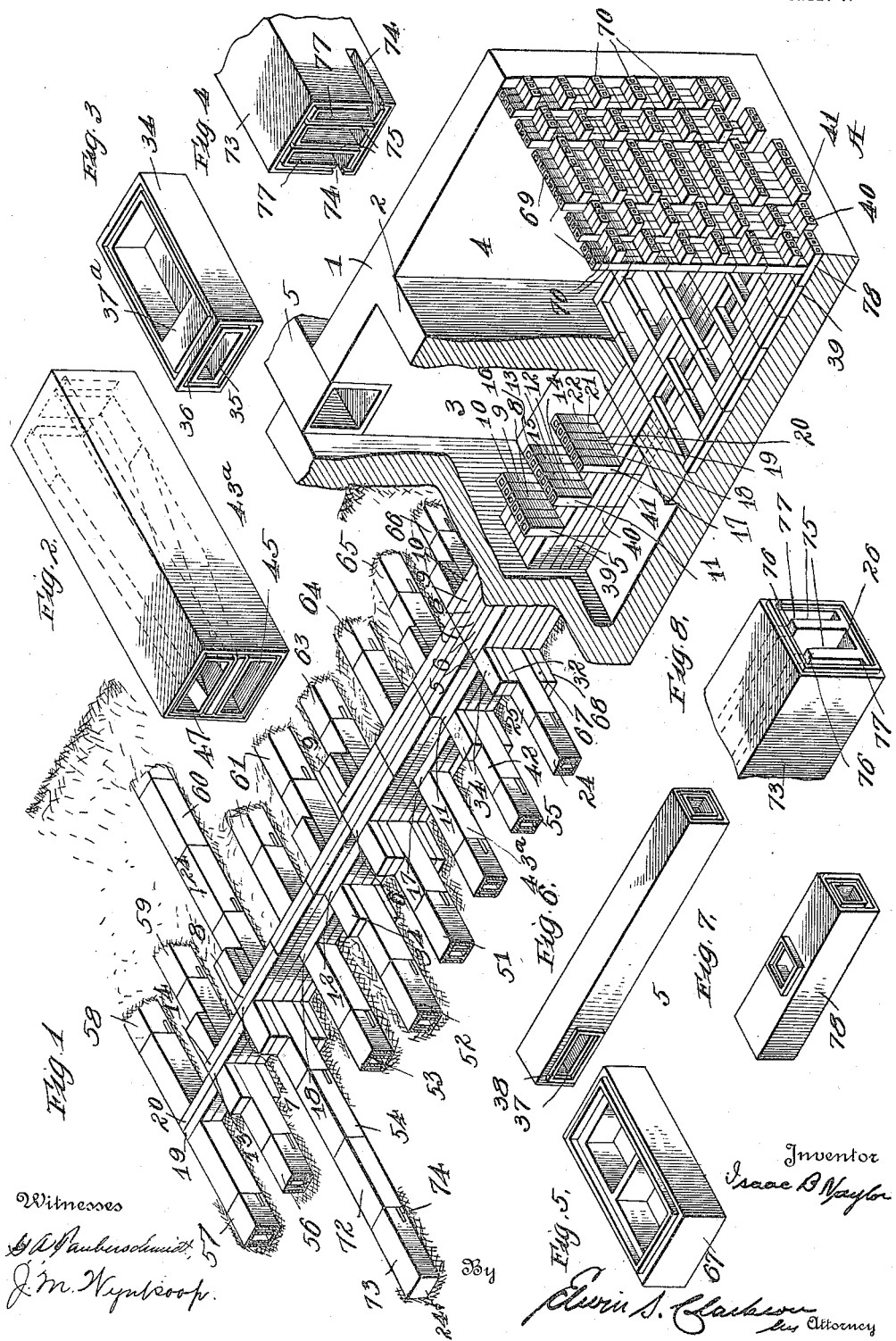

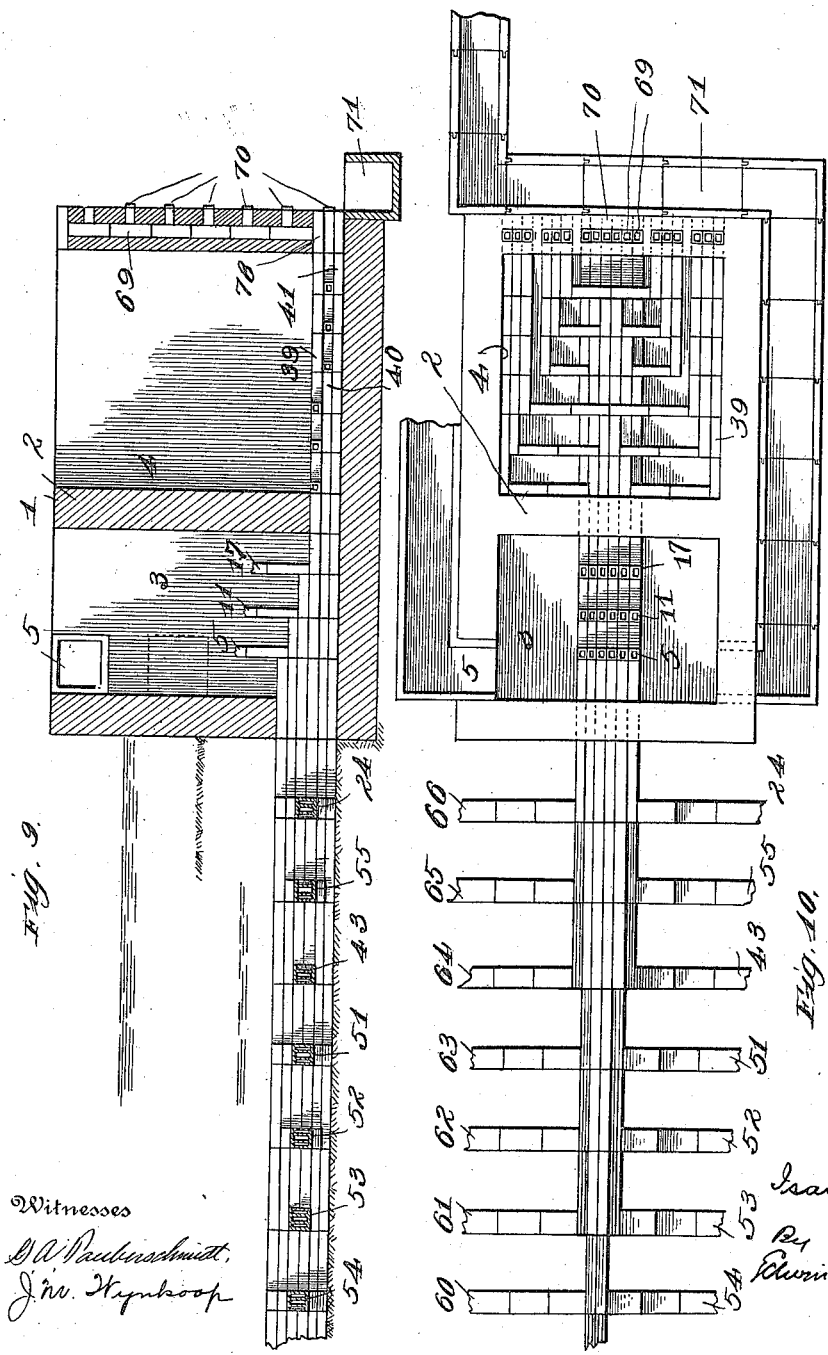

I. B. NAYLOR.
IRRIGATION.
APPLICATION FILED OCT. 28, 1913.
1,153,332.
Patented Sept. 14, 1915.
9 SHEETS—SHEET 3.
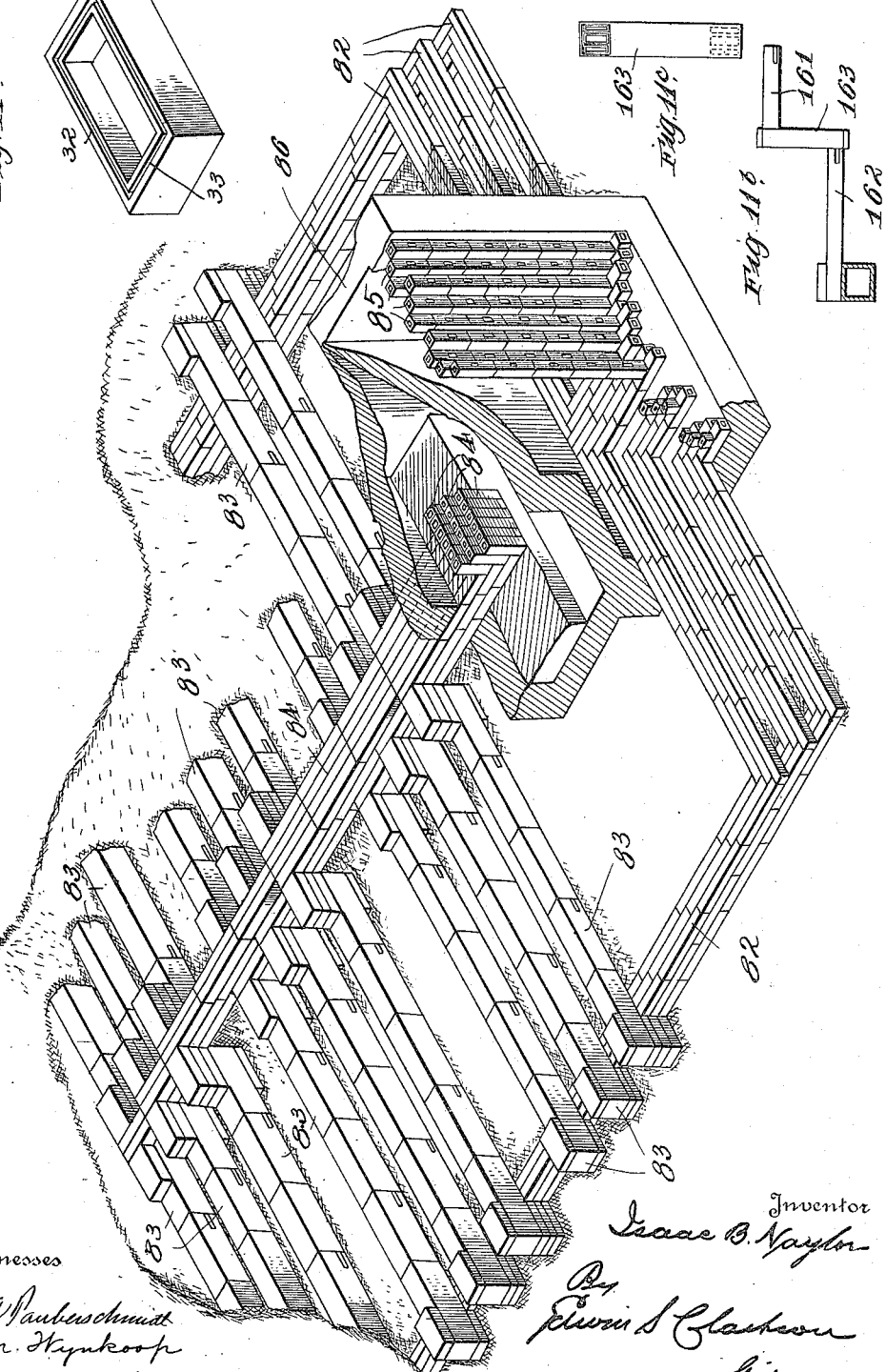

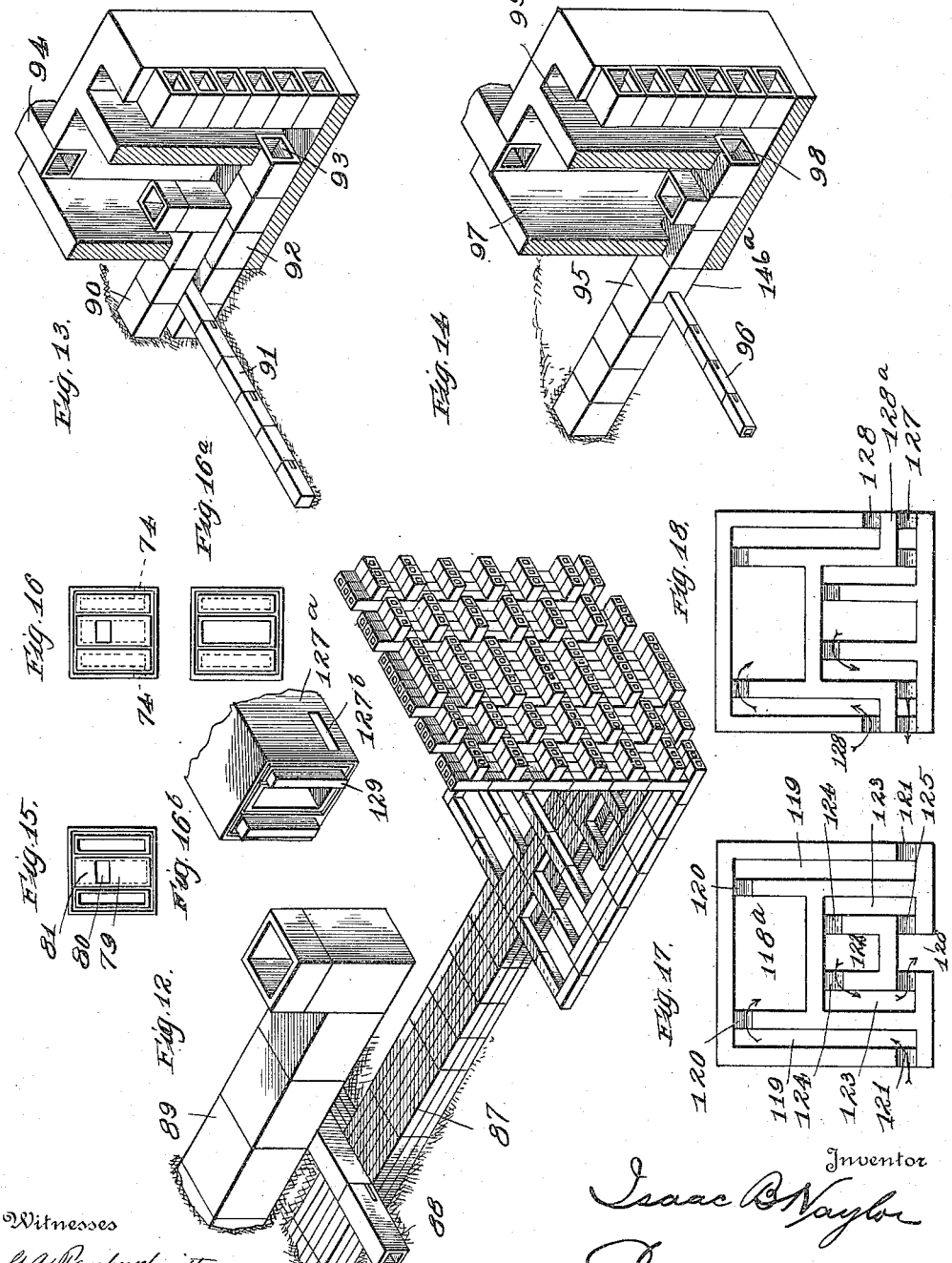

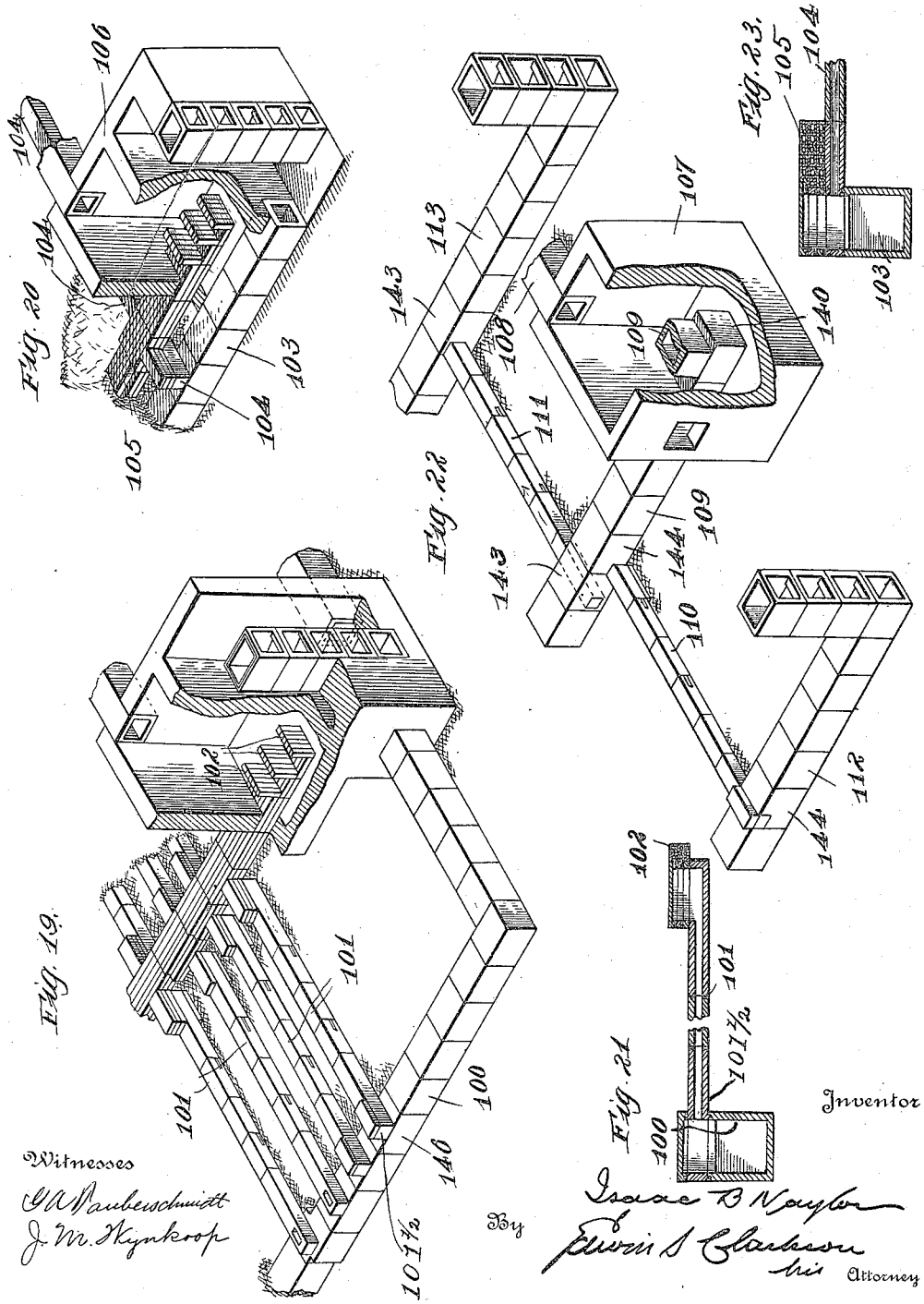

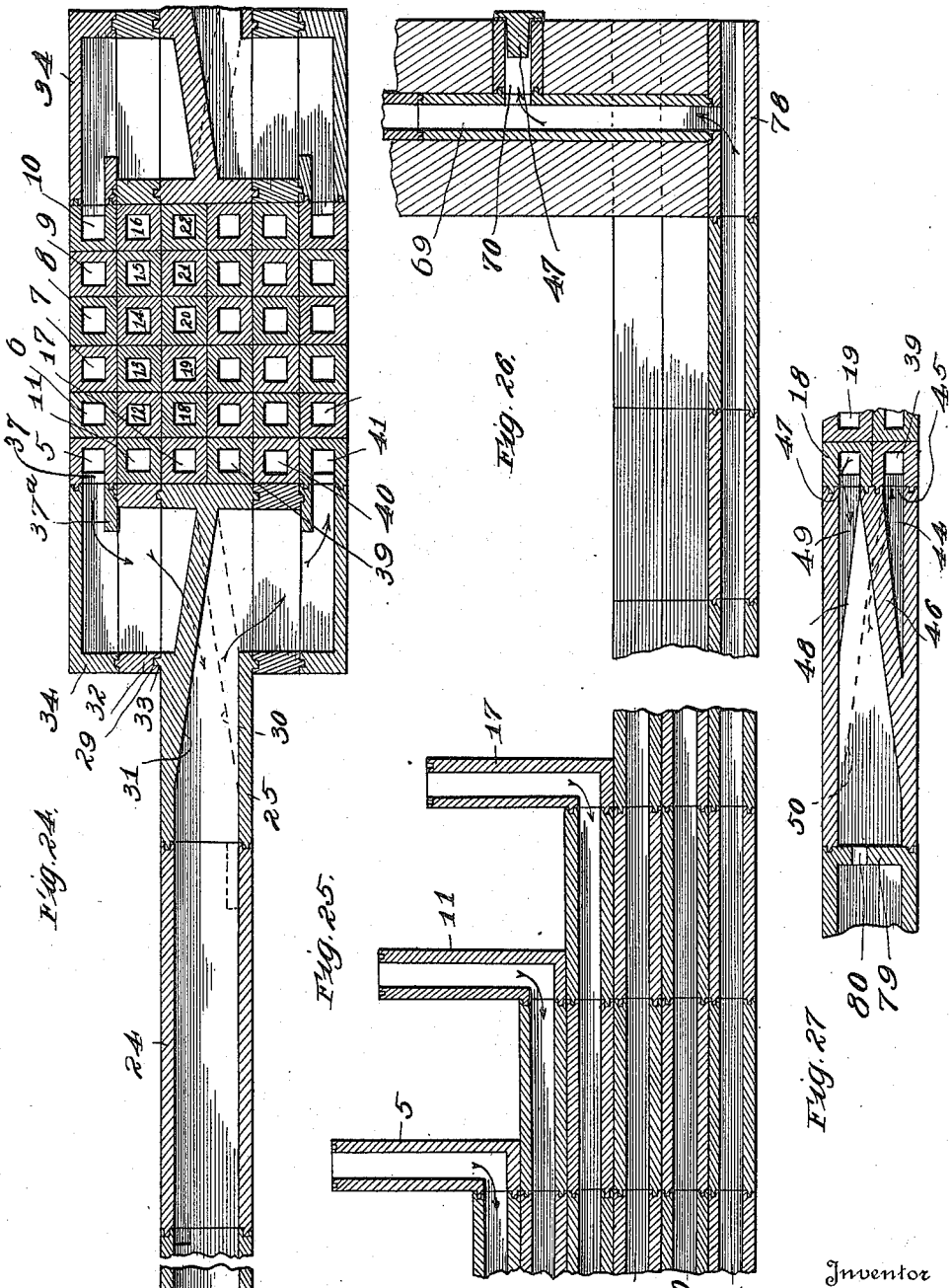

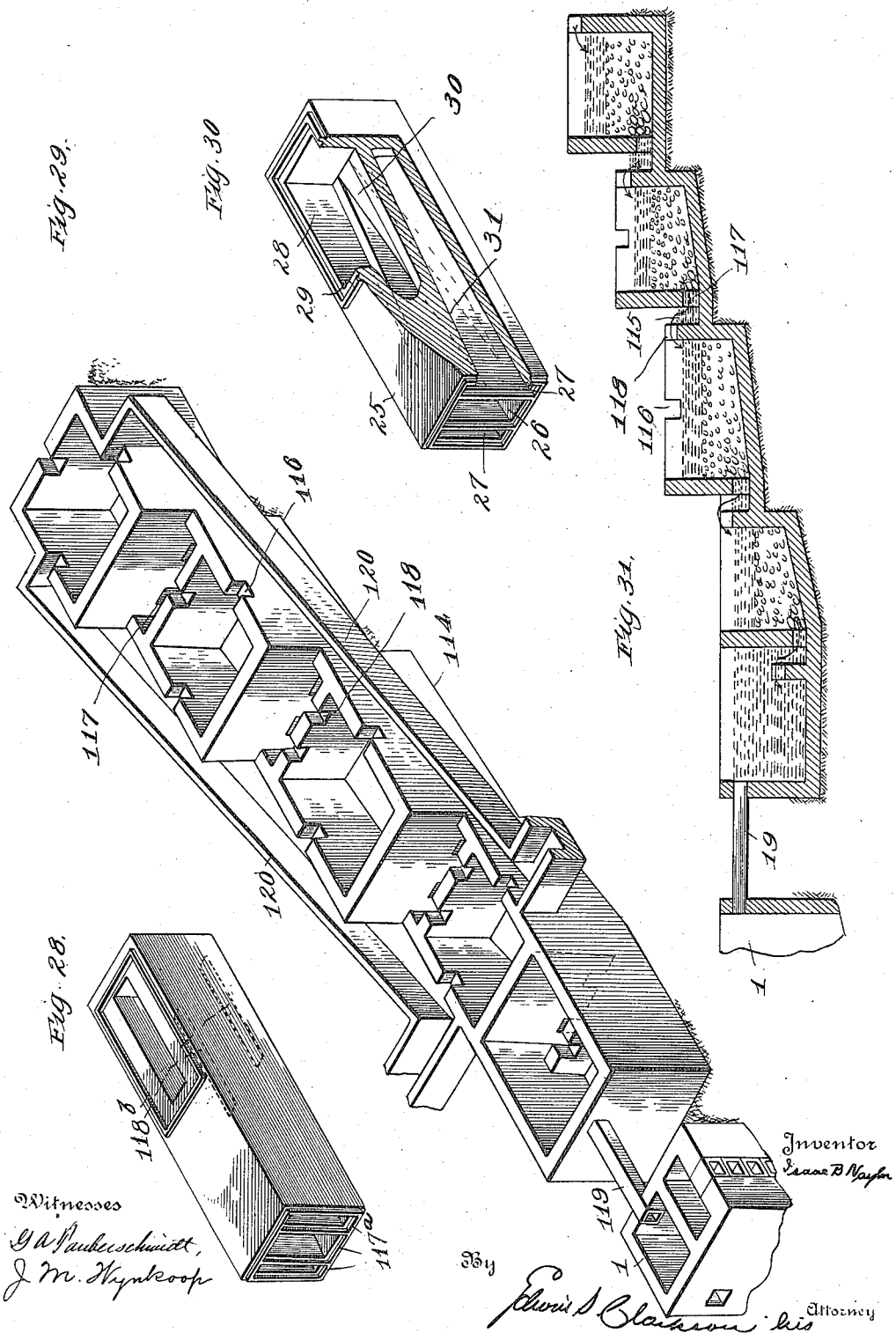

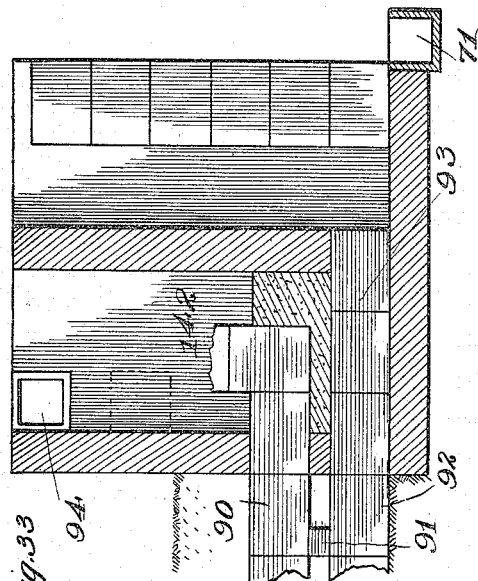
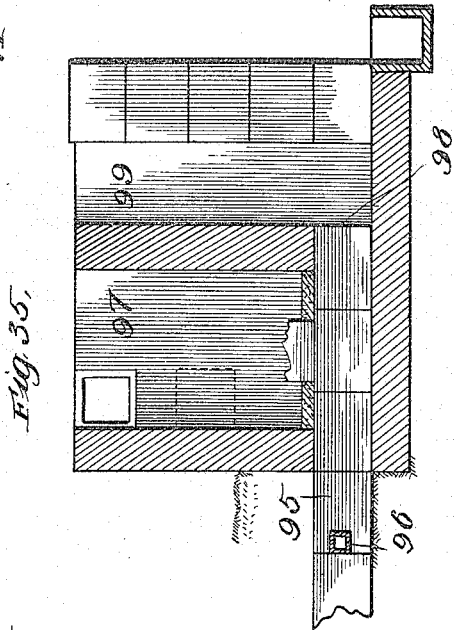
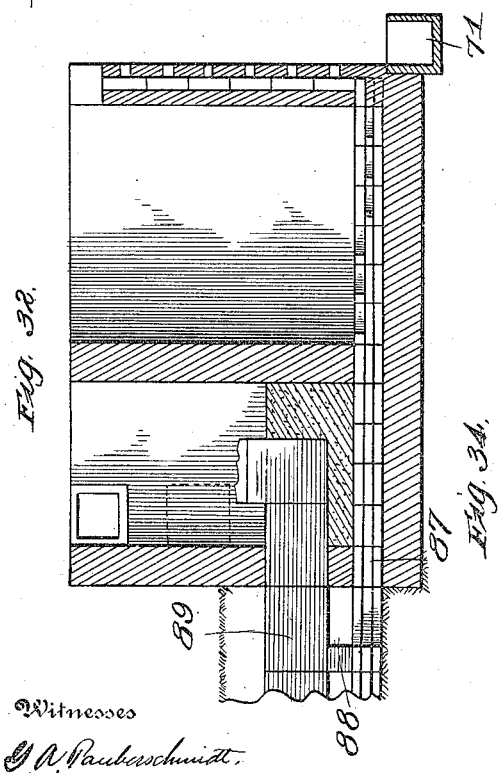
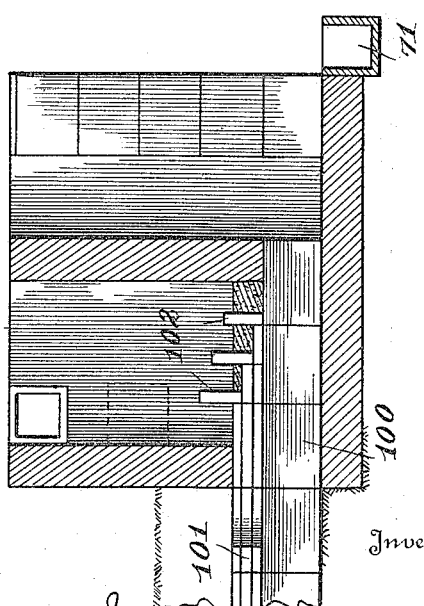

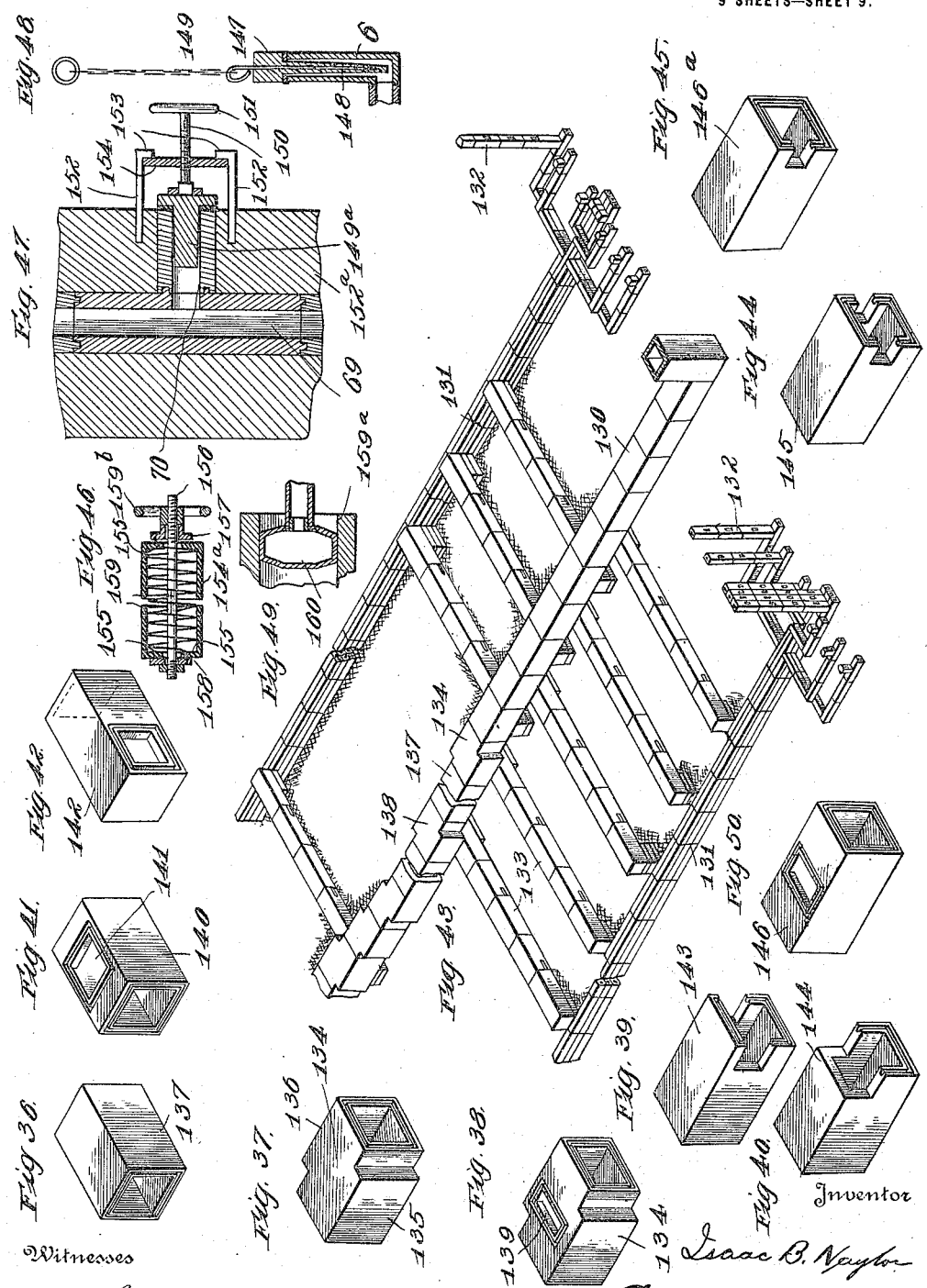

UNITED STATES PATENT OFFICE.

ISAAC B. NAYLOR, OF NEW YORK, N. Y.

IRRIGATION.

1,153,332.   Specification of Letters Patent.   Patented Sept. 14, 1915.

Application filed October 28, 1913. Serial No. 797,857.

*To all whom it may concern:*

Be it known that I, ISAAC B. NAYLOR, a citizen of the United States, residing at New York, county of New York, and State of New York, have invented certain new and useful Improvements in Irrigation, of which the following is a specification.

The object of my invention is to provide an apparatus or system whereby the irrigation, aeration, fertilization and drainage may be operated or controlled independently, generally or conjointly from one, two, three or more station or stations, at one or more levels and in different positions.

A further object of my invention is to provide an apparatus or system whereby any one particular line of lateral pipes or any particular combination of lines of lateral pipes laid in conjunction therewith and connecting thereto may be made to become active or inactive at will without interruption or conflicting with one or the other in the act of irrigation, aeration, fertilization or drainage.

A still further object of my invention is to provide a filter feed for the apparatus or system whereby any interfering solids in the natural water used or any contaminating substances encountered in handling the water used may be leeched therefrom and the water made fit before entering the reservoir supplying the irrigating pipes of said apparatus or system.

In the drawings Figure 1 is a perspective view of a combined irrigation and drainage system embodying my invention showing the individual intake and individual drain for each lateral controlled at one station whereby the water flows from and returns to a common source. Fig. 2 is a perspective view of one of the supply intake pipes. Fig. 3 is a perspective view of one of the inlet boxes. Fig. 4 is a detail perspective view of the end of one of the pipes. Fig. 5 is a perspective view of one of the filler or intermediate sections. Fig. 6 is a perspective view of one of the pipes. Fig. 7 is a perspective view of one of three way pipe sections. Fig. 8 is a detail perspective view of the other end of the pipe shown in Fig. 4. Fig. 9 is a longitudinal vertical section of Fig. 1. Fig. 10 is a top plan view of Fig. 1. Fig. 11 is a perspective view of a combined irrigation and drainage system wherein the drainage is returned from the outer ends of the lateral pipes, each having individual control at one station. Fig. 11$^a$ is a perspective view of one of the bottom and top seals. Fig. 11$^b$ is a side elevation of a lateral arranged to accommodate different levels of land. Fig. 11$^c$ is an elevation of the vertical pipe shown in Fig. 11$^b$. Fig. 12 is a detail perspective view of a combined irrigation and drainage system showing a general control of the intake and an individual control of the outlet of each lateral, controlled at one station, whereby the water flows from and returns to a common source. Fig. 13 is a detail perspective view of a combined irrigation and drainage system wherein the lateral extension serves as a drainage and irrigation pipe, the feed being under general control and the outlet being under general control at one station, whereby the water flows from and returns to a common source. Fig. 14 is a detail perspective view of a combined irrigation and drainage system with general control at one station, the supply and return passing through the same pipe. Fig. 15 is an end view of a joint of the lateral pipe showing the water seal course left open and the water gate shown in the intake course cast integrally. Fig. 16 is a similar view showing the water seal closed. Fig. 16$^a$ is an end view of a joint or pipe section showing the side channels closed at one end and the central pipe open from end to end. Fig. 16$^b$ is a detail perspective view of the end of one of the pipe sections showing a combined plug for the water seal of the side channels and binders. Figs. 17 and 18 are transverse sectional views through two types of pipe used in my system. Fig. 19 is a perspective view of a system embodying my invention with individual control of irrigation and general control of drainage from one station. Fig. 20 is a detail perspective view of a system like that shown in Fig. 19 except that the drainage comes back through the irrigating lateral. Fig. 21 is a longitudinal vertical sectional view through the lateral shown in Fig. 19 the return drainage and the supply pipes being in transverse section. Fig. 22 is a detail perspective view of a system embodying my invention showing the drain pipe outside of the reservoir with three station control. Fig. 23 is a detail sectional view of Fig. 20. Fig. 24 is a cross sectional view of the main pipes extending longitudinally of the first lateral in Fig. 1. Fig. 25 is an enlarged detail longitudinal vertical section of Fig. 1, through the intakes. Fig. 26 is a similar view through the drains and overflows. Fig. 27 is a longitudinal vertical section through one of the supply intake pipes. Fig. 28 is a perspective view of one of the pipes partly broken away. Fig. 29 is a perspective view of the filter. Fig. 30 is a perspective view of one of the pipes partly broken away. Fig. 31 is a longitudinal sectional view through the filter. Fig. 32 is a longitudinal vertical section of Fig. 12. Fig. 33 is a longitudinal vertical section of Fig. 13. Fig. 34 is a longitudinal vertical section of Fig. 20. Fig. 35 is a longitudinal vertical section of Fig. 14. Figs. 36 to 42 and Figs. 44 and 45 are perspective views of various pipe sections. Fig. 43 is a perspective view of an irrigation and drainage system showing the use of the irregular pipe sections in the supply pipe. Fig. 46 is a longitudinal vertical section through one type of control valve for the flood control. Fig. 47 is a similar view of another type of valve for the flood control. Fig. 48 is a vertical central section of one of the irrigation water pipe intakes and its valve. Fig. 49 is a diagrammatic view of a modified form of valve for the overflow uprights. Fig. 50 is a perspective view of one of the pipe units.

The reference numeral 1 designates a chamber divided by means of a wall 2 into a supply reservoir 3 and a drainage chamber 4. 5 is the water supply pipe leading from a suitable source into said reservoir.

As will be seen from the following specification the irrigation and drainage system is constructed on the unit plan and the various pipes used in the system are square in cross section whereby the pipes may be laid one upon the other and constitute a very stable construction. The larger pipes being multiples of the smaller pipes.

In Fig. 1 it will be seen that the irrigation feed pipes 5 to 22 both inclusive pass through one wall of the reservoir 3 and have upturned ends within the reservoir. The pipe 5 extends to the first lateral 24, and is connected therewith as follows: The lateral 24 is made up of as many sections as may be desired or required by the area to be irrigated, drained, fertilized or aerated.

The first section of the lateral, designated by the numeral 25, is divided into three channels, the central channel 26 (see Fig. 30) constituting the pipe for irrigating water, and the channels 27 constituting pipes for the drainage water. 28 is an opening through the top of the pipe section 25 which is surrounded by a tongue 29 set back from the edge of said opening. The bottom of the irrigating water channel or pipe 26 is inclined downwardly and forwardly from the opening 28, said bottom being designated by the numeral 30 (see Fig. 24) while the top walls 31 of the drainage pipes 27 are inclined in the opposite direction.

A filler block 32 having a groove 33 in its under face is placed around the opening 28, the groove 33 receiving the tongue 29 thereby locking the filler block to the section 25. A cap 34 is placed over the filler block and has a tongue and groove locking connection with said block as shown in Fig. 24. This cap 34 is provided with a rectangular opening 35 through one end thereof which is surrounded by a groove 36. 37$^a$ is a water shelf projecting within the cap, the purpose of which is to deliver the water at a point beyond the wall of the cap so that it may have a sheer drop through the filler block into the section 25 through the opening 28; besides which it serves as a wear plate to prevent the edge of the cap from becoming worn by the action of the water. The parts being in the position shown in Figs. 1 and 24 the water pipe 5 is connected with the opening 35 as follows: The pipe 5 has an opening 37 formed at one end thereof in one of its side walls of an area commensurate with the opening 35 in the cap 34, and this opening 37 is surrounded by a tongue 38 which fits into the groove 36 in the cap 34 thus firmly interlocking the two members. The water pipe 5 is supported in its position by means of the water pipes 11 and 17 and the drain pipes 39, 40 and 41 to be hereinafter referred to. The next lateral 42 is connected to the reservoir 3 by means of the irrigation water pipe 11, as shown in Fig. 1 and as this pipe is on a lower horizontal plane than the pipe 5 I omit the filler block on this lateral so that the cap 34 (of the same construction as above described) is in alinement with the irrigation water pipe 11. The first section 43$^a$ of the next lateral 43 is of different construction from the first section of the laterals 25 and 42 and is best illustrated in the sectional view Figs. 2 and 27. This section is divided into three channels, the central channel serving as the irrigation water pipe, while the two side channels serve as the drainage water pipes which drainage pipes open into a common space 44 which is in communication with a laterally disposed elongated discharge opening 45. The bottom of the irrigation water channel is inclined downwardly as at 46, the highest portion thereof being on a line with the lower edge of the elongated laterally disposed opening 47. The tops of the partitions dividing the section 43 into channels are inclined downwardly as at 48 to a point in alinement with the bottom of the opening 47 thereby forming a space 49 at the mouth of the irrigation water channel. The space between the channel partitions and the sides of the section are closed at the top by means of fillers 50 so that irrigation water cannot pass into the draining channels and drainage water cannot pass into the irrigation water channel. Now I have the lateral 43 with two elongated laterally disposed openings 45 and 47. The irrigation water pipe 17 extends to the lateral 43 and is provided on one side with an elongated opening surrounded by a tongue (as fully described in connection with the pipe 5ª, see Fig. 6) which interlocks with a groove surrounding the opening 47 and forms therewith a water tight joint. Irrigation water pipe 7 connects with lateral 54; irrigation water pipe 6 connects with lateral 51; irrigation water pipe 12 connects with lateral 52, irrigation water pipe 13 connects with lateral 56, irrigation water pipes 18, 19, 20 respectively connect with laterals 53, 57 and 58. The other nine irrigation water pipes 8, 9, 10, 14, 15, 16, 21, 22, 23 are connected with the laterals 58 to 66 as just explained.

I will now describe the drainage in connection with the laterals first described: The lateral 25 has an opening similar to opening 28 (see Fig. 30) with which the under filler block 67 has a tongue and groove joint; a cap 68 (corresponding to cap 34) underlies the block, the opening in the cap registering with the opening in the side of the drainage pipe 41 (corresponding with the pipe 5 Fig. 6). The lateral 55 is connected with the drainage pipe 40, and the lateral 43 is connected with the drainage pipe 39 and so on throughout the laterals.

The outer or discharge ends of the drainage pipes have upright pipes 69 connected with them each of which has a series of overflow outlets 70 controlled by a suitable valve which enables me to regulate the flood and drained conditions in the ground. For instance: If I open the ends of all of the drain pipes I am enabled to completely drain the land. If on the other hand I wish to drain or flood the land only to a certain depth I open the overflow outlets 70 corresponding to that depth, and I can maintain that flood condition so long as I keep the inlet water pipes closed. Different flood or drain levels are indicated in the upper left hand corner of Fig. 9. The drainage overflow can be caught in the overflow trough 71 and by suitable means conducted to a reservoir and used for irrigation in the same field from which it is drained or in another field.

The pipe unit sections comprising the laterals may be alternately inactive and irrigating sections. The inactive sections 72 are divided into three channels extending from end to end of the section; the middle channel being the irrigation water channel while the two side channels are the drainage water channels. The irrigating section 73 has channels similar to the section 72 but is provided with discharge ports 74 on each side at one end thereof communicating with the drainage channels; at the other end of the section 73 there is an overflow port 76 in the top of each partition, through which water overflows from the channel 26 into the side channels 77 along which it flows until it reaches the discharge ports 74 through which it flows into the ground for the purpose of irrigation. When it becomes necessary to drain the ground the supply of water is cut off from the reservoir, whereupon, after opening up the ends of the drainage pipes, the water flows through the ports 74 into the channels 77 thence to the drainage pipes, 39, 40, 41 &c. &c. from which it is discharged as above explained. The section of the drainage pipes which permits of the connection with the upright overflow pipes is at 78 shown in Fig. 7. There is a tongue and groove joint between all of the pipes. The purpose of arranging inactive sections in the laterals is to prevent an oversupply of irrigation. The sections of the laterals each have a gate 80, there being an air space 81 between the top of said gate and bottom of the top wall of the section to insure aeration of the irrigating water.

I may introduce fertilizers of various kinds, according to the needs of the crops into the water pipes thus applying it directly to the roots of the plants and the fertilizer can be fed to a particular part of the field by introducing it in the water pipe connected to the lateral in that part of the field.

It will be seen that the system in Fig. 1 provides for individual control of each lateral as to irrigation, drainage, fertilization and aeration and that the irrigation and drainage pass through the lateral.

I will now refer to the system shown in Fig. 11 because it is very similar to the one shown in Fig. 1 and just above described. The only difference between the two systems is that I connect the drainage pipes 82, to the outer ends of the laterals 83. 84 are the irrigating water pipes, 85 the overflow control pipes, 86 the chamber.

In Fig. 12 the drainage pipes 87 and laterals 88 are like those described in connection with Fig. 1 but the water supply pipe 89 is common to all of the laterals.

In Fig. 13 the irrigation water pipe 90 is common to all of the laterals 91 and the drainage water pipe 92 is likewise common to all of the laterals so that the control is from one station. While the pipes are being used for irrigation the end 93 of the drainage pipe is closed. 94 is the supply.

In Fig. 14, the irrigating water and drainage water pass through the same pipe 95 and this pipe is common to all of the laterals 96. The pipe 95 has an intake in the reservoir chamber 97, and an outlet 98 in the chamber 99. The outlet 98 is capped when the system is being used for irrigation.

The system shown in Fig. 19 is similar to that shown in Fig. 11 except that the drainage pipe 100 is common to all of the laterals 101 so that I have individual control for the irrigation water pipes 102 and general control from one station for the drainage. See in connection with this figure, Fig. 21.

In Fig. 20 I show a system similar to that shown in Fig. 19 except that the common drainage pipe 103 is connected with the inner end of the laterals 104. 105 are the irrigation water pipes and 106 the chamber.

The sectional view in Fig. 23 shows the relative position of the drainage, irrigation water and lateral pipes.

Fig. 22 is illustrative of a three way control system especially adapted for rolling land. In this figure 107 is the chamber, 108 the inlet, 109 the irrigation water pipe common to all of the laterals 110 and 111. The laterals 110 have a common drainage pipe 112 and the laterals 111 have a common drainage 113. It will be noted that in this system the drainage pipes do not lead back to the chamber 107 as in the other systems. It is this difference that adapts this particular system to rolling land inasmuch as the discharge of each drainage pipe can be located according to the topography of the land.

In Fig. 16 the discharge ports 74 are shown in dotted lines.

In many localities the water is full of slime and is otherwise impure; therefore I provide the filter shown in Figs. 29 and 31 to cleanse the water. This filter is composed of a number of boxes 114 with a space 115 between successive boxes and overflow ports 116 in each side. The exit port 117 of each box is at the bottom thereof while the inlet 118 to each box is at the top of the box. Each box is filled with sand and gravel as shown. 119 is an overflow leading into the chamber 1. On each side of the boxes is a spill way 120 extending from the uppermost box to the lowermost box, but one, the object of which is to receive the scum and other impurities which overflow from the boxes 104 through the ports 116.

In Fig. 28 I have shown another form of lateral pipe section which differs from that shown in Fig. 30 in that the channels 117ª are of the same height throughout their length, and each side channel has a separate discharge 118ᵇ.

In Fig. 17 I illustrate another embodiment of my invention for the lateral pipe sections in which 118ª is the drain water pipe, 119 the channels communicating with said pipe by means of the ports 120, said channels having inlet ports 121. 122 is the irrigation water pipe having channels 123 on opposite sides thereof and communicating therewith by means of overflow ports 124. 125 are ports leading from the bottom of the channels 123 into a slot 126 in the bottom of the pipe. Of course this type of pipe is laid on loose gravel or sand base or similar material which acts as a percolator for water discharged in order that the water may flow freely from the slot 126 and thence into the land. The head of the column of water in the channels 123 is sufficient to prevent sand etc. from rising in said channel and clogging the same and its ports.

In Fig. 18 the exit ports 127 for the irrigation water are formed through the side walls of the pipe, and run parallel with the inlet ports 128 from which they are separated by walls 128ª, otherwise the construction is the same as in Fig. 17, except of course there is no need for the slot in the bottom of the pipe.

The direction of flow of water is indicated by the arrows in the several figures.

In Fig. 16ª I have shown the side channels closed at one end while the central channel is open from end to end.

In Fig. 16ᵇ the pipe 127ª has the discharge port 127ᵇ and is provided with plugs 129 which serve to close the ends of the water seal channels and also act as a binder between abutting sections.

In Fig. 43 130 is the irrigation water pipe common to all of the laterals and 131 are the drainage water pipes terminating with the vertical flood standards 132 as previously described in connection with several other figures.

As the system is extended to cover a very large area the distance between the central longitudinal axis of the pipe 130 and the drain pipes varies by reason of the fact that certain drain pipes terminate at the several laterals 133; consequently some provision must be made for this variation which equals the diameter of the pipes terminated and I compensate for this by the irregular pipe sections shown in detail in Figs. 36, 37 and 38.

The first irregular section 134 has an offset 135 and an offset 136 not in alinement with each other. The extent of the offset is equal to the diameter of the particular drainage pipe terminating opposite this point. The next section 137 is a straight regular pipe section alining with the offset 135. The next section 138 is another irregular pipe section like section 134 which compensates for the dropping off or termination of another drain pipe. This arrangement of irregular pipe sections is continued to the end of the system. In Fig. 38 I illustrate the section 134 in an inverted position to show the outlet 139 to which the lateral pipe is connected.

In Fig. 41 I illustrate in detail the pipe unit 140 having an opening 141 in one of its sides which unit is adapted for use in the systems, as for instance in Fig. 22.

Fig. 42 is a perspective view of another pipe unit I make use of in the system; see for instance 142 in Fig. 33.

In Figs. 39 and 40 I illustrate the pipe units 143 and 144 used in Fig. 22.

Figs. 44 and 45 are illustrative of the pipe units 145 and 146ª which are shown in use in Fig. 14. The pipe unit 144, Fig. 22, is illustrated in Fig. 40 in perspective.

Referring to Fig. 48, the irrigation intake pipe 6 is shown provided with a valve 147 having an enlarged head and a pendant extension 148 which extends some distance into the pipe. A pull 149 is secured to the valve by means of which it is operated. The quantity of water entering the pipe per minute may be regulated according to the distance the pendant projects into the pipe as will be readily understood.

In Fig. 47 the upright 69 is shown as provided with an overflow port 70 as already explained. 149ª is a tapering plug valve adapted to close said overflow. 150 is a screw stem secured to the valve and provided with an operating handle 151. 152 are brackets extending from the cement wall 152ª in which the uprights are embedded, and terminating in inwardly turned flanges 153. 154 is an abutment washer or plate mounted between said brackets and back of the flanges 153 and provided with a screw threaded opening through which the stem 150 passes whereby the movement of the valve is controlled.

In Figs. 46 and 49 I show other types of valves which may be used in place of valve 149ª. In Fig. 46, 154ª is a rubber tube having an inwardly projecting flange 155. 156 is a rod passing through the tube 154ª on which is mounted washers 157 and 158. 159 is a coiled spring mounted inside said tube around the rod 156, one end of which is secured to the washer 157 while the other end is secured to the washer 158. 159ᵇ is an operating handle.

In Fig. 49, 159ª is the overflow port and 160 is an inflatable valve mounted therein.

In Fig. 11ᵇ I have shown an arrangement whereby laterals 161 and 162 on different levels may be connected by the vertical unit 163. The vertical unit 163 is provided with three openings at each end corresponding to the three channels in the laterals heretofore described.

What I claim is:

1. In a combined irrigation and drainage system, the combination with a central station, of drainage pipes, individual control for each pipe and means at the central station to regulate the depth of drainage by the respective pipes.

2. In a drainage system, the combination with a central chamber, divided into a supply reservoir and a drainage pipe chamber, of an irrigation water pipe extending from the said supply reservoir, a lateral connected with said irrigation water pipe, and a drainage water pipe also connected with said lateral and extending into said drainage chamber, and a vertical control pipe extending from the drainage pipe within said chamber, a plurality of discharge ports in said vertical pipe arranged one above the other, and a valve for each port, whereby the depth of drainage and the height of the flood in the land may be regulated at will.

3. In a drainage system, the combination with a central station, of a series of drainage pipes extending therefrom to different points in the area to be drained, means at said central station controlling the discharge from each pipe individually whereby the height of the flood and the depth of the drainage in different parts of the area reached by said pipes may be regulated at will independent of the other points of the area.

4. In a combined irrigation and drainage system, the combination with a chamber divided into a water supply reservoir and a drainage chamber, of irrigating pipes extending from the supply reservoir, laterals connected to said irrigation pipes and a drainage pipe connected to each lateral and leading back to the drainage chamber, a vertical control pipe extending from each drainage pipe within said chamber, a plurality of overflow ports in each of said vertical pipes arranged one over the other and a valve for each port whereby the depth of drainage and the height of the flood can be regulated at will.

5. In a drainage and irrigation system, the combination with a pipe section, longitudinally extending partitions in said section, dividing the section into two vertical sides and a vertical middle channel, the side channels merging into one channel at one end of the section and terminating in a horizontally disposed opening, the middle channel terminating in a horizontally disposed opening parallel with the opening of the combined side channels, the bottom of the middle channel being inclined; one of said openings serving to conduct drainage water from the side channels while the other opening serves to conduct irrigation water into the middle channel.

6. In a drainage and irrigation system, the combination with a central station of control, of a series of irrigation water pipes extending from said station to different points in the area to be irrigated, means in said station for controlling each of said pipes separately to control the amount of water to be delivered at any given point in the said area, and drainage pipes leading from different points throughout the area to be drained, to said central station, and means at said station to control each drainage pipe separately whereby the amount of drainage at any given point in the area can be regulated; whereby the height of the flood and depth of the drainage in different parts of the area reached by said pipes may be regulated, from a central station, at will independent of the other points of the area.

7. In an irrigation and drainage system, a pipe unit comprising drainage channels extending from the bottom to the top of the pipe inside thereof, a drainage pipe therebetween, ports connecting said channels and pipe at the top thereof and ports leading from the bottom of said channels outside of the pipe, irrigation water seal channels formed below the said drainage pipe and between the drainage channels, an irrigation water pipe formed therebetween, ports establishing communication with the irrigation channels and pipe at the top thereof and ports leading from the bottom of the irrigation channels outside of the pipe.

8. In an irrigation and drainage system, the combination with a water supply pipe and a drainage pipe, of a pipe closed at one end, parallel partitions extending longitudinally of said pipe forming two side channels and a water pipe central thereof, a port in the upper side of said pipe leading into the said central water pipe, said water supply pipe registering with said port, a plurality of ports in the under side of said pipe registering respectively with said side channels, said drainage pipe communicating with and being common to said plurality of ports.

9. In an irrigation and drainage system, the combination with a water supply pipe and a drainage pipe immediately below the water pipe, of a lateral pipe common to the water supply and drainage pipe, and having direct communication therewith, said lateral pipe being divided into three channels, the central channel serving as an irrigation water pipe while the two side channels serve as drainage water pipes, said side channels opening into a common space which is in ported communication with the first named drainage pipe, the bottom of the water channel being inclined in the direction of its length from the main water supply pipe, the tops of the partitions being inclined in the direction of their length toward the main water supply pipe, thereby forming an enlarged chamber at the juncture between the said main water supply pipe and the said lateral pipe.

10. In an irrigation and drainage system, the combination with a series of main water supply pipes and a series of main irrigation pipes, said series of main water supply pipes being superimposed upon said series of main irrigation pipes, each pipe of each series terminating at a different point, a lateral combined irrigation and drainage pipe having communication with a main water and a main irrigation pipe terminating at the same point; said communication comprising a cap having an enlarged discharge opening in its underface leading into the said lateral pipe and an intake opening in one of its end walls communicating with a main water pipe, and a cap having an enlarged opening in its upper face communicating with said lateral pipe and an opening in one of its end walls communicating with a main drainage pipe.

11. In an irrigation and drainage system, the combination with a series of main water supply pipes and a series of main irrigation pipes, said series of main water supply pipes being superimposed upon said series of main irrigation pipes, each pipe of each series terminating at a different point, a lateral combined irrigation and drainage pipe having communication with a main water and a main irrigation pipe terminating at the same point; said communication comprising a cap having an enlarged discharge opening in its underface leading into the said lateral pipe and an intake opening in one of its end walls communicating with a main water pipe, and a cap having an enlarged opening in its upper face communicating with said lateral pipe and an opening in one of its end walls communicating with a main drainage pipe, and a central control station common to the drainage and the irrigation pipes, whereby each pipe may be controlled independently of the other pipes.

In testimony whereof I affix my signature in presence of two witnesses.

ISAAC B. NAYLOR.

Witnesses:
EDWIN S. CLARKSON,
I. T. STANLEY.